US009286084B2

(12) United States Patent
Yalamanchili et al.

(10) Patent No.: US 9,286,084 B2
(45) Date of Patent: Mar. 15, 2016

(54) ADAPTIVE HARDWARE RECONFIGURATION OF CONFIGURABLE CO-PROCESSOR CORES FOR HARDWARE OPTIMIZATION OF FUNCTIONALITY BLOCKS BASED ON USE CASE PREDICTION, AND RELATED METHODS, CIRCUITS, AND COMPUTER-READABLE MEDIA

(71) Applicant: QUALCOMM Incorporated, San Diego, CA (US)

(72) Inventors: Kishore Yalamanchili, San Diego, CA (US); Yogeshwar Narayanan Nagaraj, San Diego, CA (US); Rashmi Keshava Iyengar, San Diego, CA (US); Dilip Krishnaswamy, Bangalore (IN); Rodolfo Giacomo Beraha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 14/143,263

(22) Filed: Dec. 30, 2013

(65) Prior Publication Data

US 2015/0186158 A1     Jul. 2, 2015

(51) Int. Cl.
*G06F 9/44* (2006.01)
*G06F 9/50* (2006.01)
*G06F 9/445* (2006.01)

(52) U.S. Cl.
CPC .......... *G06F 9/44505* (2013.01); *G06F 9/5066* (2013.01)

(58) Field of Classification Search
CPC ..................... G06F 9/44505; G06F 9/5066
See application file for complete search history.

(56) References Cited

U.S. PATENT DOCUMENTS

| 7,500,083 | B2 * | 3/2009 | Trivedi ............... G06F 15/7864 712/34 |
| 8,205,066 | B2 | 6/2012 | Brewer et al. |
| 9,075,911 | B2 * | 7/2015 | Mohan ............... G06F 11/3612 |
| 2003/0041312 | A1 * | 2/2003 | Fueki ............... G06F 15/7867 717/100 |
| 2012/0022832 | A1 | 1/2012 | Shannon et al. |
| 2013/0111472 | A1 | 5/2013 | Son et al. |
| 2014/0100835 | A1 * | 4/2014 | Majumdar .......... G06Q 10/047 703/11 |

* cited by examiner

*Primary Examiner* — Stefan Stoynov
(74) *Attorney, Agent, or Firm* — Withrow & Terranova, PLLC

(57) ABSTRACT

Adaptive hardware reconfiguration of configurable co-processor cores for hardware optimization of functionality blocks based on use case prediction, and related methods, circuits, and computer-readable media are disclosed. In one embodiment, an indication of one or more applications for possible execution is received. Execution probabilities for respective ones of the one or more applications are received. One or more mappings of the one or more applications to one or more functionality blocks is accessed, and a net benefit of hardware reconfiguration of one or more configurable co-processor cores of a multicore central processing unit for the one or more functionality blocks is calculated based on the execution probabilities and the mappings. An optimal hardware reconfiguration is determined based on a current hardware configuration and the calculated net benefit. The configurable co-processor cores are reconfigured based on the optimal hardware reconfiguration.

20 Claims, 12 Drawing Sheets

| APPLICATIONS (62) | FUNCTIONALITY BLOCKS (64) | USAGE TIME INDICATORS (66) |
|---|---|---|
| TR_GAME | COLLISION_DETECTION | 0.3 |
| SMS_APP_1 | SPEECH_TO_TEXT | 0.73 |
| MYCAM_IMGEDIT | IMAGE_ROTATION | 0.39 |
| MYCAM_IMGEDIT | EDGE_DETECTION | 0.52 |

APPLICATION-TO-FUNCTIONALITY-BLOCK TRANSLATION TABLE (58)

MANY-TO-MANY APPLICATION-TO-FUNCTIONALITY-BLOCK TRANSLATION TABLE (110)

| APPLICATIONS (114) | FUNCTIONALITY BLOCKS (116) | USAGE TIME INDICATORS (118) |
|---|---|---|
| $APP_A$ | $BLOCK_A$ | 0.5 |
| $APP_A$ | $BLOCK_B$ | 0.3 |
| $APP_A$ | $BLOCK_C$ | 0.1 |
| $APP_B$ | $BLOCK_B$ | 0.8 |
| $APP_B$ | $BLOCK_D$ | 0.1 |
| $APP_C$ | $BLOCK_B$ | 0.6 |
| $APP_C$ | $BLOCK_E$ | 0.1 |
| $APP_D$ | $BLOCK_A$ | 0.3 |

APPLICATION-TO-APPLICATION-CATEGORY TRANSLATION TABLE (120)

| APPLICATIONS (124) | APPLICATION CATEGORIES (126) |
|---|---|
| NEED FOR SPEED | GAMES_COLLISION/PHYSICS |
| AGE OF EMPIRES | GAMES_COLLISION/PHYSICS |
| CHESS | GAMES_PUZZLE |
| SODUKO | GAMES_PUZZLE |
| CAMERA | CAMERA_IMAGES |
| INSTAGRAM | CAMERA_IMAGES |

ADAPTIVE HARDWARE RECONFIGURATION OF CONFIGURABLE CO-PROCESSOR CORES FOR HARDWARE OPTIMIZATION OF FUNCTIONALITY BLOCKS BASED ON USE CASE PREDICTION, AND RELATED METHODS, CIRCUITS, AND COMPUTER-READABLE MEDIA

BACKGROUND

I. Field of the Disclosure

The technology of the disclosure relates to reconfiguration of configurable co-processor cores in central processing unit (CPU)-based systems.

II. Background

A central processing unit (CPU) found in contemporary digital computers may include multiple "processor cores," or independent processing units, for reading and executing program instructions. A multicore CPU combines two or more independent cores into a single package comprised of a single-piece integrated circuit (IC). Each core may independently implement optimizations such as superscalar execution, pipelining, and multithreading. A system with N cores is conventionally most effective when it is presented with N or more threads concurrently.

Special-purpose processors, often referred to as "hardware accelerators," may be provided to perform certain types of operations. For example, a processor executing a program may offload certain types of operations to a hardware accelerator (e.g., a graphics accelerator or a floating-point accelerator) that is configured to efficiently perform those types of operations. Such hardware accelerators may employ specialized hardware to perform some functions faster than is possible in software running on a normal (general-purpose) CPU. The hardware accelerators may also provide improved power consumption compared to software-only execution. Hardware accelerators may be designed for computationally intensive software code. Depending upon granularity, hardware accelerators can vary from small single functional units to large blocks of multiple functional units.

Recent developments in CPU design have yielded CPUs with configurable co-processor cores that may be adaptively reconfigured to provide hardware accelerators. For example, a configurable co-processor core may be reconfigured based on a particular application that is of immediate interest to a user, and that is predicted to be executed by the CPU. The configurable co-processor core may initially be configured to provide a hardware accelerator for image processing, and then may subsequently be reconfigured to provide a hardware accelerator for collision detection for gaming. Using existing techniques, reconfiguration of a configurable co-processor core may be initiated manually, or may be initiated automatically based on simple hardware counters that track usage of specific hardware accelerators. However, automatic reconfiguration of configurable co-processor core based on simple hardware counters may not provide a sufficiently accurate model of application usage patterns. Moreover, such counter-based reconfiguration mechanisms may not provide optimal support for multitasking environments in which multiple concurrently executing applications are simultaneously contending for computing resources of the CPU.

SUMMARY OF THE DISCLOSURE

Embodiments of the disclosure provide adaptive hardware reconfiguration of configurable co-processor cores for hardware optimization of functionality blocks based on use case prediction. Related methods, circuits, and computer-readable media are also disclosed. In this regard, in one embodiment, an adaptive hardware reconfiguration circuit is provided. The adaptive hardware reconfiguration circuit includes a profile analysis agent, a predictor agent, an optimization agent, and application-to-functionality-block mappings. The profile analysis agent is configured to provide use case prediction by indicating one or more applications indicated for potential execution by a multicore central processing unit (CPU) based on an application usage model. The predictor agent generates execution probabilities for the indicated applications, and provides the execution probabilities to the optimization agent. Mappings of the indicated applications to corresponding functionality blocks (i.e., discrete subsets of program code for providing specific sets of functionality) may be accessed by the optimization agent. By taking into account the execution probabilities and the mappings, the optimization agent determines a net benefit of reconfiguration of configurable co-processor core(s) of the multicore CPU for each functionality block. In this manner, the optimization agent may determine an optimal hardware reconfiguration for one or more configurable co-processor cores, and may cause configurable co-processor cores of a multicore CPU to be reconfigured accordingly.

In another embodiment, a method of adaptive hardware reconfiguration of configurable co-processor cores of a multicore CPU for hardware optimization of functionality blocks based on use case prediction is provided. The method comprises receiving an indication of one or more applications for possible execution, and receiving one or more execution probabilities for respective ones of the one or more applications. The method additionally comprises accessing one or more mappings of the one or more applications to one or more functionality blocks. The method also comprises calculating a net benefit of hardware reconfiguration of one or more configurable co-processor cores of a multicore CPU for the one or more functionality blocks based on the one or more execution probabilities and the one or more mappings. The method further comprises determining an optimal hardware reconfiguration of the one or more configurable co-processor cores based on a current hardware configuration and the calculated net benefit. The method additionally comprises reconfiguring the one or more configurable co-processor cores based on the optimal hardware reconfiguration.

In another embodiment, an adaptive hardware reconfiguration circuit configured to provide hardware optimization of functionality blocks based on use case prediction is provided. The adaptive hardware reconfiguration circuit comprises a profile analysis agent configured to indicate one or more applications for possible execution. The multicore CPU further comprises a predictor agent configured to determine one or more execution probabilities for respective ones of the one or more applications. The multicore CPU additionally comprises an optimization agent. The optimization agent is configured to access one or more mappings of the one or more applications to one or more functionality blocks. The optimization agent is further configured to calculate a net benefit of hardware reconfiguration of one or more configurable co-processor cores for the one or more functionality blocks based on the one or more execution probabilities and the one or more mappings. The optimization agent is additionally configured to determine an optimal hardware reconfiguration of the configurable co-processor cores based on a current hardware configuration and the calculated net benefit. The adaptive hardware reconfiguration circuit also comprises a hardware controller configured to reconfigure the one or more configurable co-processor cores based on the optimal hardware reconfiguration.

In another embodiment, an adaptive hardware reconfiguration circuit configured to provide hardware optimization of functionality blocks based on use case prediction is provided. The adaptive hardware reconfiguration circuit includes one or more configurable co-processor cores, and a means for storing one or more mappings of one or more applications to one or more functionality blocks. The adaptive hardware reconfiguration circuit further includes a profile analysis means configured to indicate the one or more applications for possible execution. The adaptive hardware reconfiguration circuit also includes a predictor means configured to determine one or more execution probabilities for respective ones of the one or more applications. The adaptive hardware reconfiguration circuit additionally includes an optimization means configured to access the one or more mappings. The optimization means is further configured to calculate a net benefit of hardware reconfiguration of the one or more configurable co-processor cores for the one or more functionality blocks based on the one or more execution probabilities and the one or more mappings. The optimization means is also configured to determine an optimal hardware reconfiguration of the one or more configurable co-processor cores based on a current hardware configuration and the calculated net benefit. The adaptive hardware reconfiguration circuit further includes a hardware controller means configured to reconfigure the one or more configurable co-processor cores based on the optimal hardware reconfiguration.

In another embodiment, a non-transitory computer-readable medium is provided, having stored thereon computer-executable instructions to cause a processor to implement a method for adaptive hardware reconfiguration of configurable co-processor cores of a multicore CPU for hardware optimization of functionality blocks based on use case prediction. The method implemented by the computer-executable instructions comprises receiving an indication of one or more applications for possible execution and receiving one or more execution probabilities for respective ones of the one or more applications. The method implemented by the computer-executable instructions additionally comprises accessing one or more mappings of the one or more applications to one or more functionality blocks. The method implemented by the computer-executable instructions also comprises calculating a net benefit of hardware reconfiguration of one or more configurable co-processor cores of a multicore CPU for the one or more functionality blocks based on the one or more execution probabilities and the one or more mappings. The method implemented by the computer-executable instructions further comprises determining an optimal hardware reconfiguration of the one or more configurable co-processor cores based on a current hardware configuration and the calculated net benefit. The method implemented by the computer-executable instructions additionally comprises reconfiguring the one or more configurable co-processor cores based on the optimal hardware reconfiguration.

BRIEF DESCRIPTION OF THE FIGURES

FIG. 3 is a diagram illustrating an exemplary application-to-functionality-block translation table, including usage time indicators, that may be used by the adaptive hardware reconfiguration circuit of FIG. 2 for mapping applications to constituent functionality blocks;

FIG. 7 is a diagram illustrating an exemplary many-to-many application-to-functionality-block translation table that may be utilized by the adaptive hardware reconfiguration circuit of FIG. 2 in decision making, which may also be useful in resolving contentions in a multitasking environment;

FIGS. 8A and 8B are diagrams illustrating an exemplary application-to-application-category translation table and an exemplary application-category-to-functionality-block translation table, which together may be used by the adaptive hardware reconfiguration circuit of FIG. 2 to access one or more mappings;

DETAILED DESCRIPTION

Figure 1:
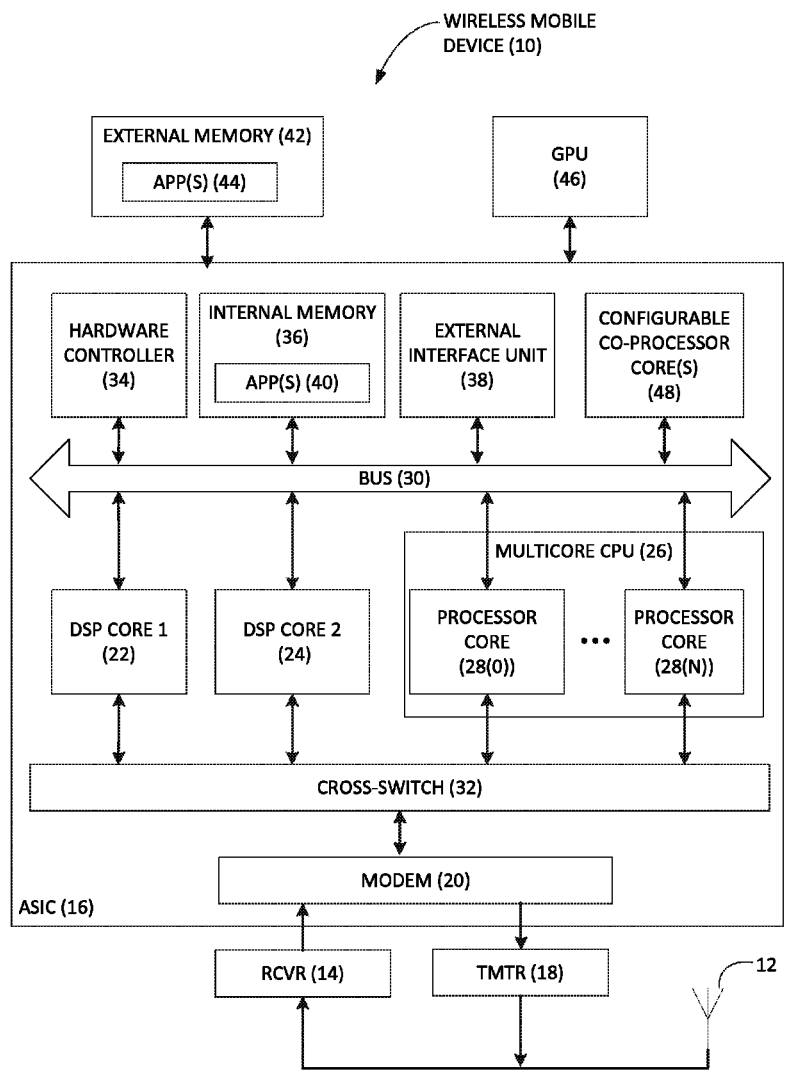
FIG. 1 is a block diagram of an exemplary wireless mobile device incorporating a multicore central processing unit (CPU) having one or more configurable co-processor cores.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide adaptive hardware reconfiguration of configurable co-processor cores for hardware optimization of functionality blocks based on use case prediction. Related methods, circuits, and computer-readable media are also disclosed. In this regard, in one embodiment, an adaptive hardware reconfiguration circuit is provided. The adaptive hardware reconfiguration circuit includes a profile analysis agent, a predictor agent, an optimization agent, and application-to-functionality-block mappings. The profile analysis agent is configured to provide use case prediction by indicating one or more applications indicated for potential execution by a multicore central processing unit (CPU) based on an application usage model. The predictor agent generates execution probabilities for the indicated applications, and provides the execution probabilities to the optimization agent. Mappings of the indicated applications to corresponding functionality blocks (i.e., discrete subsets of program code for providing specific sets of functionality) may be accessed by the optimization agent. By taking into account the execution probabilities and the mappings, the optimization agent determines a net benefit of reconfiguration of configurable co-processor core(s) of the multicore CPU for each functionality block. In this manner, the optimization agent may determine an optimal hardware reconfiguration for one or more configurable co-processor cores, and may cause configurable co-processor cores of a multicore CPU to be reconfigured accordingly.

In another embodiment, a method of adaptive hardware reconfiguration of configurable co-processor cores of a multicore CPU for hardware optimization of functionality blocks based on use case prediction is provided. The method comprises receiving an indication of one or more applications for possible execution, and receiving one or more execution probabilities for respective ones of the one or more applications. The method additionally comprises accessing one or more mappings of the one or more applications to one or more functionality blocks. The method also comprises calculating a net benefit of hardware reconfiguration of one or more configurable co-processor cores of a multicore CPU for the one or more functionality blocks based on the one or more execution probabilities and the one or more mappings. The method further comprises determining an optimal hardware reconfiguration of the one or more configurable co-processor cores based on a current hardware configuration and the calculated net benefit. The method additionally comprises reconfiguring the one or more configurable co-processor cores based on the optimal hardware reconfiguration.

Figure 2:
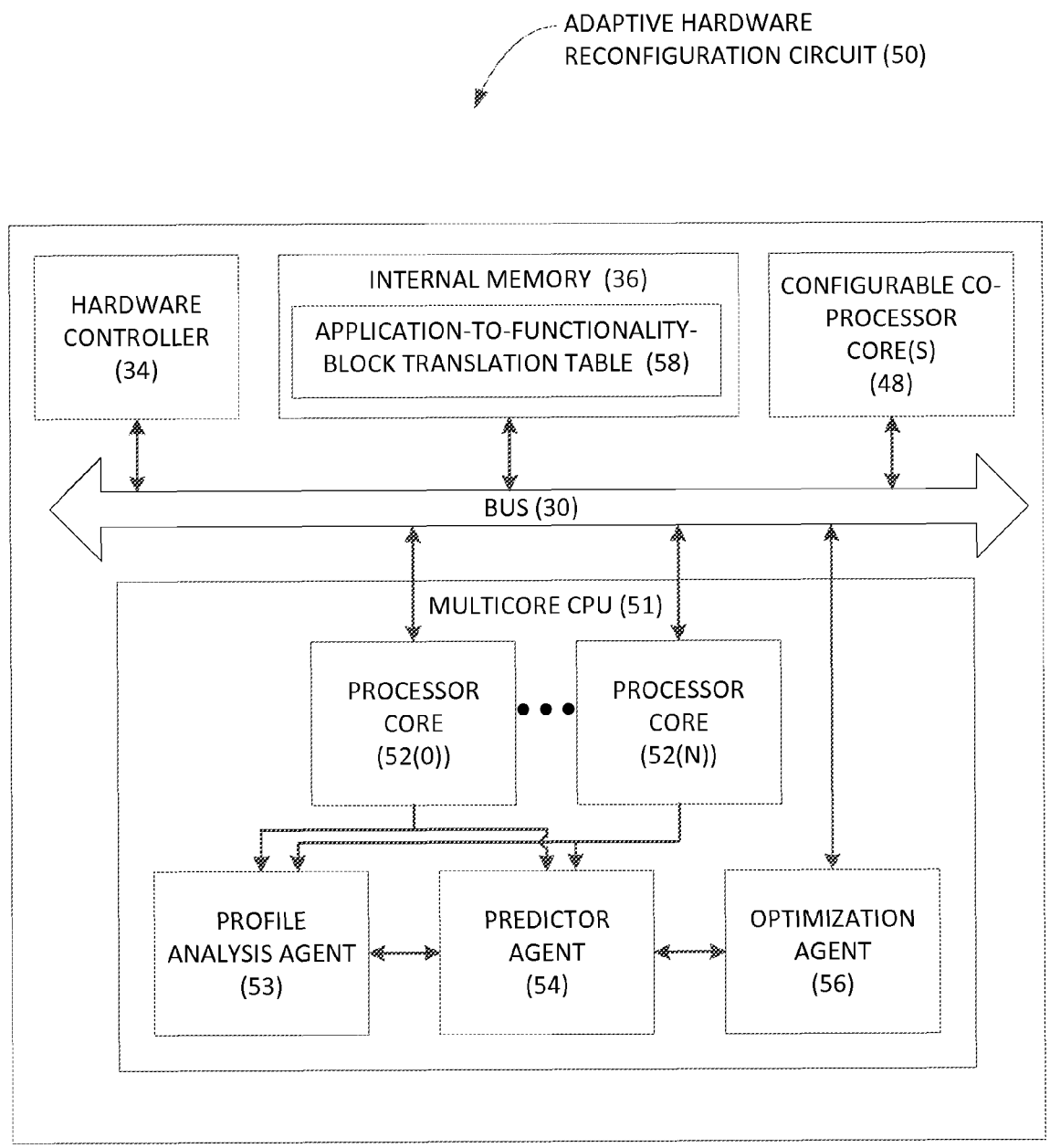
FIG. 2 is a block diagram of an exemplary adaptive hardware reconfiguration circuit for hardware optimization of functionality blocks based on use case prediction.

Before discussing operations of the adaptive hardware reconfiguration circuit disclosed herein beginning with FIG. 2, an exemplary wireless mobile device is first described with regard to FIG. 1 to illustrate hardware acceleration based on reconfiguration of configurable co-processor cores, as is known in the art. In this regard, FIG. 1 shows an exemplary wireless mobile device 10 that may monitor and/or communicate with one or more wireless communications systems, as is known in the art. The wireless mobile device 10 includes an antenna 12 that receives signals transmitted by base stations and/or satellites (not shown), and that provides a received signal to a receiver (RCVR) 14. The receiver 14 processes the received signal, and provides samples to an application-specific integrated circuit (ASIC) 16 for further processing. In some embodiments, the receiver 14 may filter, amplify, frequency-downconvert, and/or digitize the received signal, as non-limiting examples. The ASIC 16 also processes data to be transmitted, and provides the data to a transmitter (TMTR) 18. The transmitter 18 further processes the data and generates a modulated signal which is transmitted via the antenna 12. Some embodiments may provide that processing performed by the transmitter 18 comprises converting to analog, filtering, amplifying, and/or frequency-upconverting the data, as non-limiting examples. A modem 20 interfaces with the receiver 14 and the transmitter 18 to enable communications by the wireless mobile device 10.

In the example of FIG. 1, the ASIC 16 includes first and second digital signal processor (DSP) cores 22 and 24, and a multicore CPU 26. In this configuration, the multicore CPU 26 is a multicore processor that includes processor cores 28(0)-28(N). The ASIC 16 also includes a bus 30, a cross-switch 32, a hardware controller 34, an internal memory 36, and an external interface unit 38. The DSP cores 22 and 24 and the processor cores 28 of the multicore CPU 26 support various functions such as video, audio, graphics, and gaming, as non-limiting examples. Each processor core 28(0)-28(N) may be a Reduced Instruction Set Computing (RISC) machine, a microprocessor, or some other type of processor.

The hardware controller 34 controls the operation of processing units (e.g., the DSP cores 22, 24 and the processor cores 28) within the ASIC 16. The internal memory 36 stores data and/or program codes used by the processing units within the ASIC 16. In some embodiments, the data and/or program codes comprise one or more applications (APP(S)) 40. The external interface unit 38 may interface with other units external to the ASIC 16. The ASIC 16 is communicatively coupled to an external memory 42, which may store data and/or program codes such as one or more applications (APP(S)) 44. The ASIC 16 also communicates with a graphics processing unit (GPU) 46 for rapidly generating and manipulating images for display.

The ASIC 16 of FIG. 1 further includes one or more configurable co-processor cores 48, which may be part of a co-processor and/or may be implemented as one of the processor cores 28(0)-28(N) of the multicore CPU 26. With various possible usage scenarios for the wireless mobile device 10, the configurability of the configurable co-processor core(s) 48 provides an end user with the flexibility to reconfigure the hardware inside the wireless mobile device 10, similar to choosing the applications 40, 44 running on the wireless mobile device 10. Reconfiguring the configurable co-processor core(s) 48 appropriately and/or adaptively may result in hardware that provides improved or even optimal performance for a use case of current interest. As used herein, a "use case" refers to a specific observed and/or predicted flow of usage of one or more of the applications 40, 44, and/or one or more constituent functionality blocks of the applications 40, 44 by a user of the wireless mobile device 10.

The configurable co-processor core(s) 48 may be reconfigured to a desired hardware configuration by acquiring appropriate hardware configuration build files, which define how the configurable co-processor core(s) 48 are to be reconfigured to provide a specific hardware optimization. The hardware configuration build files may be obtained by downloading from an online hardware configuration store (not shown), as a non-limiting example. The online hardware configuration store may store all the configuration builds currently available for the configurable co-processor core(s) 48. These builds can be modified (including providing bug fixes for existing builds and/or adding new builds) in a manner similar to software applications in an application store. Desired hardware configuration build files may also be acquired in other ways, including but not limited to copying from a flash drive, syncing a device, transferring via a universal serial bus (USB) or other cable, and the like.

In one configuration, the configurable co-processor core(s) 48 includes a set of field-programmable gate arrays (FPGAs) (not shown) containing programmable logic components called "logic blocks," and programmable interconnects. Logic blocks can be programmed to perform the function of basic logic gates, or more complex combinational functions such as decoders or simple mathematical functions. The logic blocks also include memory elements, which may be simple flip-flops or more complete blocks of memories. A hierarchy of programmable interconnects allows the logic blocks to be interconnected. In the example of FIG. 1, the hardware controller 34 may use binary data of a downloaded hardware configuration build file from the online hardware configuration store to program the logic blocks and interconnects to implement the logical functions of a selected hardware accelerator corresponding to the hardware configuration build file.

It is to be understood that the ASIC 16 in FIG. 1 may include fewer, more, and/or different processing units than those shown in FIG. 1. The number of processing units and the types of processing units included in the ASIC 16 are dependent on various factors, such as the communications systems, applications, and functions supported by the multi-core CPU 26 of the wireless mobile device 10. Although described with reference to wireless mobile devices, reconfiguration of co-processor cores for general purpose processors, according to embodiments disclosed herein, may be implemented in desktop environments or other fixed workstations.

Multithreaded operation of the processing units of the ASIC 16 of FIG. 1 may be implemented in various ways. For example, these techniques may be implemented in hardware, firmware, software, or a combination thereof. For a hardware implementation, the multithreaded operation may be implemented within one or more ASICs, DSPs, programmable logic devices (PLDs), FPGAs, processors, controllers, microcontrollers, microprocessors, electronic devices, or other electronic units designed to perform the functions described herein, or a combination thereof. Certain aspects of the multithreaded operation may be implemented with software modules (e.g., procedures, functions, and the like) that perform the functions described. In some embodiments, the software modules may comprise the one or more applications 44 in the external memory 42 and/or the one or more applications 40 in the internal memory 36, and may be executed by a processor (e.g., the DSP cores 22 and/or 24, and/or the multicore CPU 26). The external memory 42 and/or the internal memory 36 may be implemented within the processor or external to the processor.

In the exemplary wireless mobile device 10 of FIG. 1, the configurable co-processor core(s) 48 may be reconfigured in response to manual user input. For example, a user may select a specific application use case of interest for hardware acceleration from a hardware configuration build store, and/or may manually select a previously installed hardware accelerator for use. In some embodiments, reconfiguration may be initiated automatically based on simple counters that track past usage of specific hardware accelerators. Typically, however, automatic counter-based reconfiguration may provide only a simplistic model of application usage patterns, which may not result in efficient automatic reconfiguration. Moreover, such counter-based automatic reconfiguration may not provide optimal support for multitasking environments in which multiple concurrently executing applications simultaneously contend for computing resources.

Accordingly, FIG. 2 is provided to illustrate an exemplary adaptive hardware reconfiguration circuit 50 for adaptively reconfiguring the configurable co-processor core(s) 48 of FIG. 1. The adaptive hardware reconfiguration circuit 50 is configured to perform use case prediction based on machine learning of application usage patterns, including generating application execution probabilities. The adaptive hardware reconfiguration circuit 50 also maps the applications predicted to execute to their constituent functionality blocks. By taking into the account application execution probabilities and the application-to-functionality-block mappings, the adaptive hardware reconfiguration circuit 50 determines a net benefit of reconfiguration of the configurable co-processor core(s) 48 for each functionality block. In this manner, the adaptive hardware reconfiguration circuit 50 may determine an optimal hardware reconfiguration for the configurable co-processor core(s) 48, and may cause the configurable co-processor core(s) 48 to be reconfigured accordingly. In some embodiments, the configurable co-processor core(s) 48 may be reconfigured to maximize system performance for a predicted use case, while some embodiments may provide that the configurable co-processor core(s) 48 are reconfigured to minimize energy usage for the predicted use case.

As seen in FIG. 2, the adaptive hardware reconfiguration circuit 50 that provides hardware optimization for functionality blocks may include components of the wireless mobile device 10 of FIG. 1, including but not limited to the hardware controller 34, the internal memory 36, the configurable co-processor core(s) 48, and the bus 30. The adaptive hardware reconfiguration circuit 50 may further include a multicore CPU 51 having processor cores 52(0)-52(N). In some embodiments, the configurable co-processor core(s) 48 may be part of any of the following: a subsystem of the multicore CPU 51; the DSP cores 22, 24; the GPU 46; and/or any other subsystem in a system on a chip (SoC). The adaptive hardware reconfiguration circuit 50 also includes a profile analysis agent 53 and a predictor agent 54, which are communicatively coupled to each other and to one or more of the configurable co-processor core(s) 48. The adaptive hardware reconfiguration circuit 50 additionally includes an optimization agent 56 that is communicatively coupled to the predictor agent 54, and that is further communicatively coupled to the bus 30. In this manner, the optimization agent 56 may communicate with other system elements including the hardware controller 34, the internal memory 36, and the configurable co-processor core(s) 48.

As discussed in greater detail below, the adaptive hardware reconfiguration circuit 50 may also include an application-to-functionality-block translation table 58, which, in some embodiments, is stored in the internal memory 36. It is to be understood that some embodiments may provide that the application-to-functionality-block translation table 58 is stored in any other type of memory accessible by the multicore CPU 51, such as the external memory 42 of FIG. 1. The application-to-functionality-block translation table 58 maps individual applications, such as the applications 40, 44 of FIG. 1, to constituent "functionality blocks." As used herein, a "functionality block" refers to a discrete subset of program code that provides a specific set of functionality to one or more applications, and that is potentially hardware-accelerable. Functionality blocks may include program code for providing collision detection functionality, edge detection functionality, image handling (e.g., image rotation) functionality, speech recognition functionality, speech-to-text functionality, and/or navigational functionality, as non-limiting examples.

Some embodiments may provide that a given application may include a single functionality block, or may comprise multiple functionality blocks. Conversely, a given functionality block may be used by a single application or may be employed by multiple applications. Accordingly, the application-to-functionality-block translation table 58 may provide one-to-one, one-to-many, many-to-one, and/or many-to-many mappings between the applications and the functionality blocks. The application-to-functionality-block translation table 58 may be automatically generated using run-time profiling data, and/or may be generated based on descriptor files accompanying a hardware configuration build file. In some embodiments, the application-to-functionality-block translation table 58 may also provide information mapping individual applications to specific application programming interface (API) calls.

FIG. 3 is provided to illustrate the application-to-functionality-block translation table 58 of FIG. 2 in more detail. As seen in FIG. 3, the application-to-functionality-block translation table 58 includes mappings 60(0)-60(3) that associate applications 62 with corresponding functionality blocks 64. For example, mapping 60(0) indicates that application TR_GAME makes use of functionality block COLLISION_DETECTION, while mapping 60(1) maps application SMS_APP_1 to functionality block SPEECH_TO_TEXT.

Both mappings 60(2) and 60(3) relate to application MYCAM_IMGEDIT, with mapping 60(2) indicating that MYCAM_IMGEDIT utilizes functionality block IMAGE_ROTATION and mapping 60(3) indicating that MYCAM_IMGEDIT employs functionality block EDGE_DETECTION.

The exemplary application-to-functionality-block translation table 58 also includes optional usage time indicators 66, which represent percentages of execution times that each of the applications 62 has historically spent using a corresponding one of the functionality blocks 64. For instance, the mapping 60(0) of the application-to-functionality-block translation table 58 indicates that 30% of execution time for application TR_GAME has been spent using functionality block COLLISION_DETECTION. In some embodiments, the usage time indicators 66 may comprise static usage time indicators that are derived based on profiling application usage of a plurality of users. Some embodiments may provide that the usage time indicators 66 may be dynamically updated based on run-time application usage profiling. Dynamically updated usage time indicators 66 may be based on an average value of past usage, on most frequently used applications (MFU), on most recently used applications (MRU), or on a weighted combination of MFU and MRU.

Figure 4:
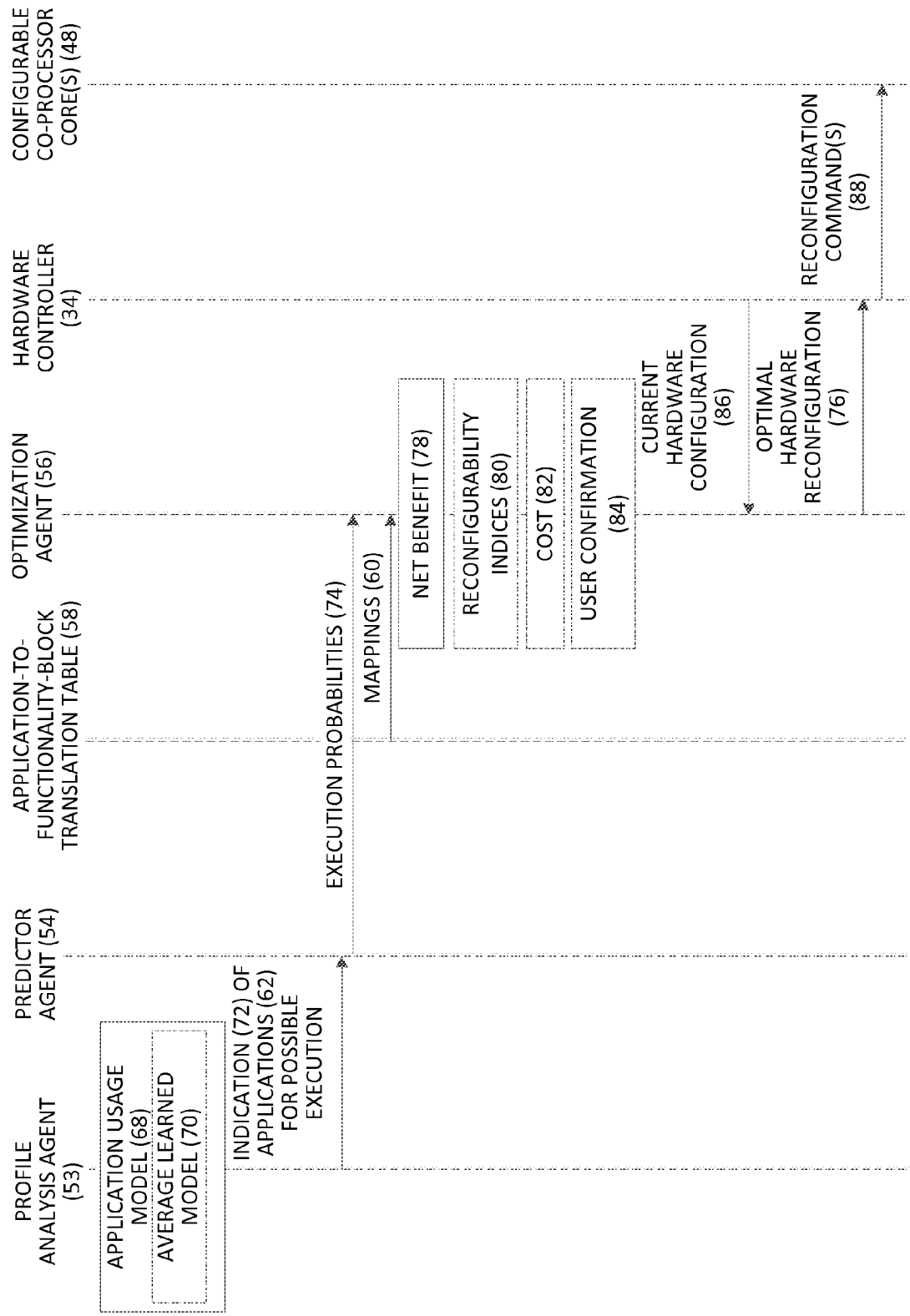
FIG. 4 is a diagram illustrating exemplary communications flows among elements of the adaptive hardware reconfiguration circuit of FIG. 2 for predicting application execution and providing hardware optimization for corresponding functionality blocks.

To better illustrate exemplary communications flows among the elements of the adaptive hardware reconfiguration circuit 50 of FIG. 2 for providing hardware optimization of functionality blocks based on use case prediction, FIG. 4 is provided. For the sake of clarity, elements of FIG. 2-3 are referenced in describing FIG. 4. In FIG. 4, the profile analysis agent 53, the predictor agent 54, the application-to-functionality-block translation table 58, the optimization agent 56, the hardware controller 34, and the configurable co-processor core(s) 48 of the adaptive hardware reconfiguration circuit 50 are each represented by vertical dotted lines.

In the example of FIG. 4, communications flows begin with the profile analysis agent 53, which provides an use case prediction to identify one or more of the applications 62 that are most likely to be used next by a user of a device (not shown) incorporating the adaptive hardware reconfiguration circuit 50. The profile analysis agent 53 may employ an application usage model 68, which incorporates a pattern of usage of the applications 62 in order to predict a probability of future usage. The application usage model 68 may include any type of classifier, such as a graphical model (e.g., a Bayesian network) or logistic regression, for outputting a probability of application usage.

In some embodiments, the application usage model 68 may be developed by the profile analysis agent 53 or other elements of the adaptive hardware reconfiguration circuit 50 based on monitoring application usage patterns for a specific user (not shown). Application usage patterns incorporated into the application usage model 68 may include a frequency of usage of one or more of the applications 62, a frequency of usage of one or more of the functionality blocks 64, a time of usage of one or more of the applications 62, a location of usage of one or more of the applications 62, an availability of network resources, or a correspondence between a usage of two or more of the applications 62, as non-limiting examples. For instance, application usage by day of week, time of day, location, and/or availability of network access may be monitored and used to generate the application usage model 68. The application usage model 68 may also take into account a tendency of a user to access specific applications in conjunction with one another (e.g., starting an image viewer application shortly after starting a camera application). In some embodiments, the profile analysis agent 53 may further incorporate global events (i.e., detected events external to the wireless mobile device 10) into the application usage model 68. In this manner, the application usage model 68 may determine a relationship between a global event and a usage of an application 62. For example, an ongoing football game may be related to a greater likelihood of a streaming video application being executed, while a nearby parade may be related to a greater probability of a camera application being executed. The profile analysis agent 53 may also incorporate data from additional sources, such as a user's calendar and/or a user's schedule planner, as non-limiting examples.

According to some embodiments, the application usage model 68 may further be based in whole or in part on an average learned model 70. The average learned model 70 may be provided (e.g., obtained via download or hardcoded as a default model) as a "seed" to initialize the application usage model 68, and may be based on anonymized application usage data for multiple users. In this manner, the average learned model 70 may provide a coarse, non-personalized model for application usage that may later be refined by the profile analysis agent 53 as the profile analysis agent 53 monitors usage patterns for a specific user over time.

Based on the application usage model 68, the profile analysis agent 53 provides an indication 72 of one or more of the applications 62 for possible execution to the predictor agent 54. The indication 72 represents the use case prediction made by the profile analysis agent 53. Based on the indication 72, the predictor agent 54 then determines specific relative execution probabilities 74 for each of the one or more applications 62 that are suggested by the indication 72 of the profile analysis agent 53 as being candidates for execution. As a non-limiting example, the execution probabilities 74 determined by the predictor agent 54 may be based on a current state of application usage as it corresponds to a known application usage pattern. In some embodiments, functionality of the profile analysis agent 53 and the predictor agent 54 may be provided by a single agent.

The execution probabilities 74 for the one or more applications 62 indicated by the indication 72 are then provided to the optimization agent 56, which is responsible for determining an optimal hardware reconfiguration 76. The optimization agent 56 makes this determination by accessing the application-to-functionality-block translation table 58 to determine one or more mappings 60 of the one or more applications 62 to one or more functionality blocks 64. The mappings 60 enable the optimization agent 56 to ascertain which functionality blocks 64 constitute the one or more applications 62 indicated by the indication 72.

Based on the execution probabilities 74 and the mappings 60, the optimization agent 56 next calculates a net benefit 78 of hardware reconfiguration for each of the functionality blocks 64 corresponding to the one or more applications 62 indicated by the indication 72. In some embodiments, the net benefit 78 may be further based on one or more reconfigurability indices 80 for the functionality blocks 64 constituting the one or more applications 62. The reconfigurability indices 80 may represent a relative benefit of reconfiguration for each of the functionality blocks 64. In some embodiments, the benefit of reconfiguration represented by the reconfigurability indices 80 may be defined as a maximization of system performance or a minimization of energy consumption, as non-limiting examples. Various approaches for calculating the reconfigurability indices 80 are discussed in greater detail below.

In some embodiments, the net benefit 78 may be calculated by comparing products of the execution probabilities 74 and corresponding reconfigurability indices 80. In this manner, the net benefit 78 may be based on the likelihood of each application 62 being executed, multiplied by the benefit of reconfiguration for each of the functionality blocks 64 used by the applications 62. For example, applications A, B, and C may be associated with execution probabilities $P_A$, $P_B$, and $P_C$, respectively, and may further be associated with reconfigurability indices $R_A$, $R_B$, and $R_C$, respectively. Accordingly, the net benefit 78 may be determined by comparing the products $P_A \times R_A$, $P_B \times R_B$, and $P_C \times R_C$, with the product having the greatest value representing the greatest net benefit 78.

According to some embodiments disclosed herein, the net benefit 78 may be determined based on a product of respective execution probabilities 74 for the applications 62 and the usage time indicators 66 for each of the functionality blocks 64 used by the applications 62. For instance, mapping 60(0) in the application-to-functionality-block translation table 58 of FIG. 3 indicates that the functionality block COLLISION_DETECTION used by the application TR_GAME has a usage time indicator of 0.3. If the execution probability 74 for the application TR_GAME is determined to be 0.7, a net execution probability for the functionality block COLLISION_DETECTION may be determined by multiplying the execution probability 74 of 0.7 by the usage time indicator 0.3. In this example, the resulting net execution probability for the functionality block COLLISION_DETECTION is 0.21, which may be used for determining the net benefit 78.

Some embodiments may provide that the net benefit 78 is further based on a cost 82 of hardware reconfiguration. The cost 82 may include a processing cost, a resource cost, a time cost, and/or an energy cost for obtaining a particular hardware accelerator and/or implementing a hardware reconfiguration of the configurable co-processor core(s) 48. Taking the cost 82 of hardware reconfiguration into account as part of the net benefit 78 may enable the optimization agent 56 to more accurately determine the optimal hardware reconfiguration 76 for the configurable co-processor core(s) 48. In some embodiments, the optimization agent 56 may also base the optimal hardware reconfiguration 76 on a user confirmation 84 of the reconfiguration. As non-limiting examples, the optimization agent 56 may prompt the user for confirmation or authorization before performing a reconfiguration.

After determining the net benefit 78, the optimization agent 56 determines the optimal hardware reconfiguration 76 based on the net benefit 78 (and optionally, the reconfigurability indices 80, the cost 82, and/or a user confirmation 84) and a current hardware configuration 86. In the example of FIG. 4, the current hardware configuration 86 is provided by the hardware controller 34 to the optimization agent 56, and may indicate one or more hardware accelerators currently in use. The optimization agent 56 provides the optimal hardware reconfiguration 76 to the hardware controller 34. Based on the optimal hardware reconfiguration 76, the hardware controller 34 issues one or more reconfiguration commands 88 to reconfigure the configurable co-processor core(s) 48. In some embodiments, reconfiguring the configurable co-processor core(s) 48 comprises reconfiguring the configurable co-processor core(s) 48 to operate as a hardware accelerator for optimal execution of the one or more functionality blocks 64 for which the greatest net benefit 78 was determined.

Figure 5:
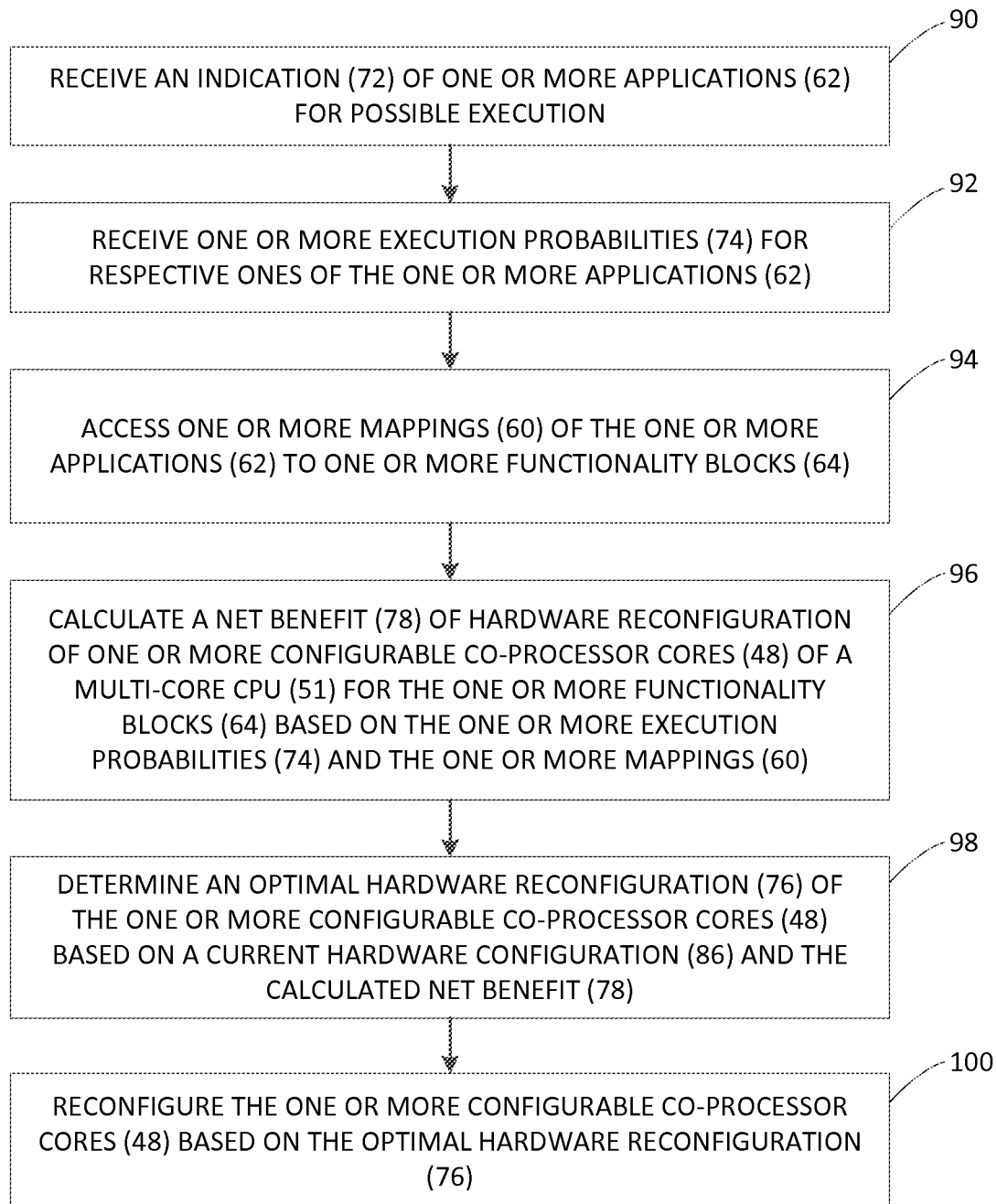
FIG. 5 is a flowchart detailing exemplary operations for providing adaptive hardware reconfiguration of configurable co-processor cores for hardware optimization of functionality blocks based on use case prediction.

To illustrate exemplary operations for providing adaptive hardware reconfiguration of configurable co-processor cores for hardware optimization of functionality blocks based on use case prediction, FIG. 5 is provided. For the sake of clarity, elements of FIGS. 2-4 are referenced in describing FIG. 5. In FIG. 5, operations begin with the adaptive hardware reconfiguration circuit 50 of FIG. 2 receiving an indication 72 of one or more applications 62 for possible execution (block 90).

In some embodiments, the indication 72 of the one or more applications 62 for possible execution may be provided by the profile analysis agent 53. The indication 72 represents the use case prediction made by the profile analysis agent 53. The use case prediction may be based on the personalized application usage model 68 and/or the average learned model 70, as non-limiting examples.

The adaptive hardware reconfiguration circuit 50 next receives one or more execution probabilities 74 for respective ones of the one or more applications 62 (block 92). Each of the one or more execution probabilities 74 represents a relative likelihood of execution of the corresponding one or more applications 62 that are indicated as candidates for execution. Some embodiments may provide that the execution probabilities 74 are provided by the predictor agent 54 of the adaptive hardware reconfiguration circuit 50 based on a current state of application usage as it corresponds to a known application usage pattern. In some embodiments, the optimization agent 56 of the adaptive hardware reconfiguration circuit 50 receives the one or more execution probabilities 74 from the predictor agent 54.

The adaptive hardware reconfiguration circuit 50 then accesses the one or more mappings 60 of the one or more applications 62 to one or more functionality blocks 64 (block 94). In some embodiments, the adaptive hardware reconfiguration circuit 50 may access the one or more mappings 60 using the application-to-functionality-block translation table 58. Some embodiments may provide that accessing the one or more mappings 60 is carried out by the optimization agent 56 of the adaptive hardware reconfiguration circuit 50. The mappings 60 enable the optimization agent 56 to determine which functionality blocks 64 constitute the one or more applications 62 indicated by the indication 72.

The adaptive hardware reconfiguration circuit 50 next calculates a net benefit 78 of hardware reconfiguration of the one or more configurable co-processor cores 48 of the multi-core CPU 51 for the one or more functionality blocks 64 based on the one or more execution probabilities 74 and the one or more mappings 60 (block 96). According to some embodiments described herein, the net benefit 78 may be calculated by comparing products of the execution probabilities 74 and corresponding reconfigurability indices 80 for the one or more functionality blocks 64, where the reconfigurability indices 80 indicate a benefit of reconfiguration for the functionality blocks 64. Thus, the net benefit 78 may be based on a probability of an application 62 being executed, multiplied by the benefit of reconfiguration for the functionality block 64 used by the application 62.

The adaptive hardware reconfiguration circuit 50 next determines an optimal hardware reconfiguration 76 of the one or more configurable co-processor cores 48 based on a current hardware configuration 86 and the calculated net benefit 78 (block 98). The adaptive hardware reconfiguration circuit 50 then reconfigures one or more configurable co-processor core(s) 48 based on the optimal hardware reconfiguration 76 (block 100). In some embodiments, reconfiguring the one or more configurable co-processor cores 48 comprises reconfiguring the one or more configurable co-processor cores 48 to operate as a hardware accelerator for optimal execution of the one or more functionality blocks 64. The hardware accelerator may be one of one or more hardware accelerators that are manually designated by a user as preferred accelerators, and/or may be automatically selected from among available hardware accelerators.

As noted above, the net benefit 78 of hardware reconfiguration that is determined by the optimization agent 56 of the adaptive hardware reconfiguration circuit 50 may be based in part on one or more reconfigurability indices 80. Each of the reconfigurability indices 80 may be associated with one of the functionality blocks 64, and may represent a relative benefit of reconfiguration for the corresponding one of the functionality blocks 64. In some embodiments, the benefit of reconfiguration represented by the reconfigurability indices 80 may be defined as a maximization of system performance or a minimization of energy consumption, as non-limiting examples. Accordingly, the specific reconfigurability indices 80 employed by the embodiments disclosed herein may vary depending on design goals and constraints.

Figure 6:
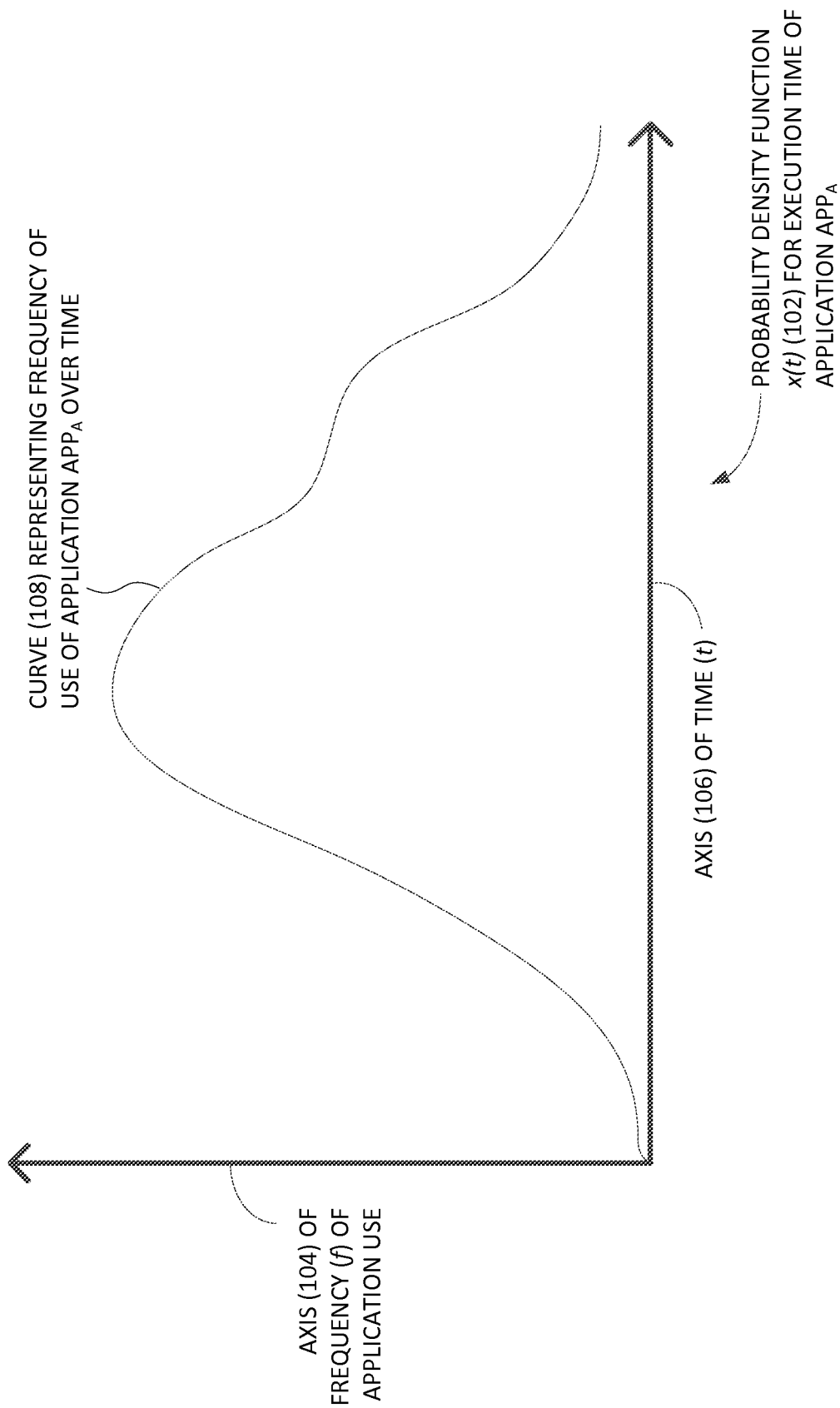
FIG. 6 is a diagram illustrating an exemplary probability density function for application execution over time, which may be used by the adaptive hardware reconfiguration circuit of FIG. 2 in calculating a net benefit of hardware reconfiguration.

In this regard, FIG. 6 illustrates an exemplary probability density function for application execution over time, which may be used by the adaptive hardware reconfiguration circuit 50 of FIG. 2 as a basis for calculating the reconfigurability indices 80. In FIG. 6, a probability density function x(t) 102 for execution time of an application $APP_A$ is plotted on two axes: a vertical axis 104 of frequency (f) of application use, and a horizontal axis 106 of time (t). A resulting curve 108 represents the frequency of use of application $APP_A$ over time.

According to some embodiments described herein, the reconfigurability indices 80 may be calculated with the goal of maximizing system performance. To determine a reconfigurability index $R_P$ indicating an expected system performance gain for the application $APP_A$ resulting from reconfiguration, assume that s represents a multiplier indicating a performance gain of reconfiguration for the application $APP_A$, compared to a purely software implementation of the application $APP_A$. For example, a value of 1.5 for s would indicate that reconfiguration of the configurable co-processor core(s) 48 as a hardware accelerator would result in the application $APP_A$ performing 1.5 times as fast as a purely software implementation of $APP_A$. The reconfigurability index $R_P$ for application $APP_A$ could thus be calculated using the following integral:

$$R_P = \int_0^T x(t)\left(t - \left(\frac{t}{s}\right)\right)dt$$

In some embodiments, use of a hardware accelerator may result in a performance gain during only a portion of the execution time of the application $APP_A$. For example, a hardware accelerator may boost the performance of a specific one of the functionality blocks 64 associated with the application $APP_A$, where the associated one of the functionality blocks 64 has a usage time indicator 66 of less than 1.0. In such embodiments, the reconfigurability index $R_P$ may be calculated by an integral such as the following, in which p represents the percentage of the application $APP_A$ receiving a performance boost:

$$R_P = \int_0^T x(t)\left(t - t*\left((1-p) + \left(\frac{p}{s}\right)\right)\right)dt$$

Depending on design goals and constraints, some embodiments may require that the benefit of reconfiguration represented by the reconfigurability indices 80 be defined as a reduction of energy consumption by the application $APP_A$. Accordingly, a reconfigurability index $R_E$ may indicate an expected energy conservation for the application $APP_A$ resulting from reconfiguration. For example, assume that E(t,p,s) represents an energy conservation due to using the reconfigured configurable co-processor core(s) 48 as a hardware accelerator for t seconds. In this example, p represents a percentage of application $APP_A$ benefiting from energy conservation, and s represents a multiplier indicating the degree of energy conservation from using the hardware accelerator relative to a purely software implementation of application $APP_A$ (i.e., an improvement in an energy consumption factor). The reconfigurability index $R_E$ may thus be calculated using the following integral:

$$R_E = \int_0^T x(t)(E(t,p,s))dt$$

The reconfigurability index $R_E$, in some embodiments, may expressly take into account the power consumption of executing the application $APP_A$ using the multicore CPU 51 versus the power consumption of executing the application $APP_A$ on the reconfigured configurable co-processor core(s) 48. The reconfigurability index $R_E$ may also incorporate the energy cost of reconfiguration in determining the benefit of reconfiguration. Assume that PC represents the power consumption of the application $APP_A$ when executing on the multicore CPU 51, and PR represents the power consumption of the application $APP_A$ when executing using the reconfigured configurable co-processor core(s) 48. Assume further that EC represents the energy cost of reconfiguring the configurable co-processor core(s) 48. The reconfigurability index $R_E$ may be expressed using the following integral:

$$R_E = \int_0^T \left[x(t)*\left(PC*t - PR*\left(\frac{t}{s}\right)\right)\right]dt - EC$$

It is to be understood that the reconfigurability indices $R_P$ and $R_E$ represent non-limiting examples of the reconfigurability indices 80. The benefit of reconfiguration represented by the reconfigurability indices 80 may vary based on the specific embodiment in which the reconfigurabilitiy indices 80 are utilized. Accordingly, operations for calculating the reconfigurability indices 80 may incorporate other optimization variables instead of or in addition to the variables discussed above.

As discussed above, exemplary embodiments of the application-to-functionality-block translation table 58 may map multiple applications 62 to multiple functionality blocks 64 (i.e., may contain many-to-many mappings). In this regard, FIG. 7 illustrates an exemplary many-to-many application-to-functionality-block translation table 110 that may be utilized by the adaptive hardware reconfiguration circuit 50 of FIG. 2. The many-to-many application-to-functionality-block translation table 110 includes mappings 112(0)-112(7) representing mappings of applications 114 to functionality blocks 116. In the example of FIG. 7, each of the applications 114 may utilize multiple accelerable functionality blocks 116, and each of the functionality blocks 116 may be utilized by multiple applications 114. For instance, mappings 112(0)-112(2) indicate that application $APP_A$ makes use of functionality blocks $BLOCK_A$, $BLOCK_B$, and $BLOCK_C$, respectively. Application $APP_B$ also makes use of $BLOCK_B$ as well as $BLOCK_D$, as indicated by mappings 112(3) and 112(4). Mappings 112(5) and 112(6) map application $APP_C$ to $BLOCK_B$ and $BLOCK_E$, respectively, while mapping 112(7) maps application $APP_D$ to $BLOCK_A$. The many-to-many application-to-functionality-block translation table 110 also includes usage time indicators 118 for indicating a percentage of execution time spent by each application 114 in the corresponding functionality blocks 116.

As seen in FIG. 7, the applications 114 may have common functionality blocks 116 that may be hardware-accelerated. Accordingly, the adaptive hardware reconfiguration circuit 50 may determine the net benefit 78 of FIG. 4 by calculating a sum of net execution probabilities for each functionality block 116. For example, assume that $APP_A$ has an execution probability of 0.5 and $APP_B$ has an execution probability of 0.25. Based on the mappings 112(0)-112(4) for applications $APP_A$ and $APP_B$, the summed net execution probabilities $P_A$, $P_B$, $P_C$, and $P_D$ for functionality blocks $BLOCK_A$, $BLOCK_B$, $BLOCK_C$, and $BLOCK_D$, respectively, may be determined as follows:

$$P_A=0.5*0.5=0.25$$

$$P_B=(0.5*0.3)+(0.25*0.8)=0.15+0.2=0.35$$

$$P_C=0.5*0.1=0.05$$

$$P_D=0.25*0.1=0.025$$

Likewise, the adaptive hardware reconfiguration circuit 50 may determine the net benefit 78 by calculating a sum of the reconfigurability indices 80 for each functionality block 116 in a similar fashion. In this manner, the many-to-many application-to-functionality-block translation table 110 may be utilized by the adaptive hardware reconfiguration circuit 50 to automatically handle application optimization in a multitasking environment.

In some embodiments, the determination of an optimal hardware reconfiguration 76 by the adaptive hardware reconfiguration circuit 50 may be more strongly influenced by an application category to which a predicted application belongs, rather than the specific predicted application itself. A user may execute different applications over time, but the different applications may still tend to have the same hardware acceleration requirements, and thus may benefit from the same hardware reconfiguration. For example, a user may frequently switch between action games that employ collision detection, or may replace a default camera application that uses photograph functionality with a different camera application that uses the same photograph functionality. Accordingly, to more efficiently determine the optimal hardware reconfiguration 76, applications may be mapped into one or more application categories, which themselves are mapped to one or more functionality blocks. The one or more mappings 60 of FIG. 4 may then be based on these application-to-application-category mappings and application-category-to-functionality-block mappings. In this manner, the adaptive hardware reconfiguration circuit 50 may efficiently provide the optimal hardware reconfiguration 76 for an application belonging to a known application category, even if usage of that specific application has not been incorporated into the application usage model 68.

Figure 8B:
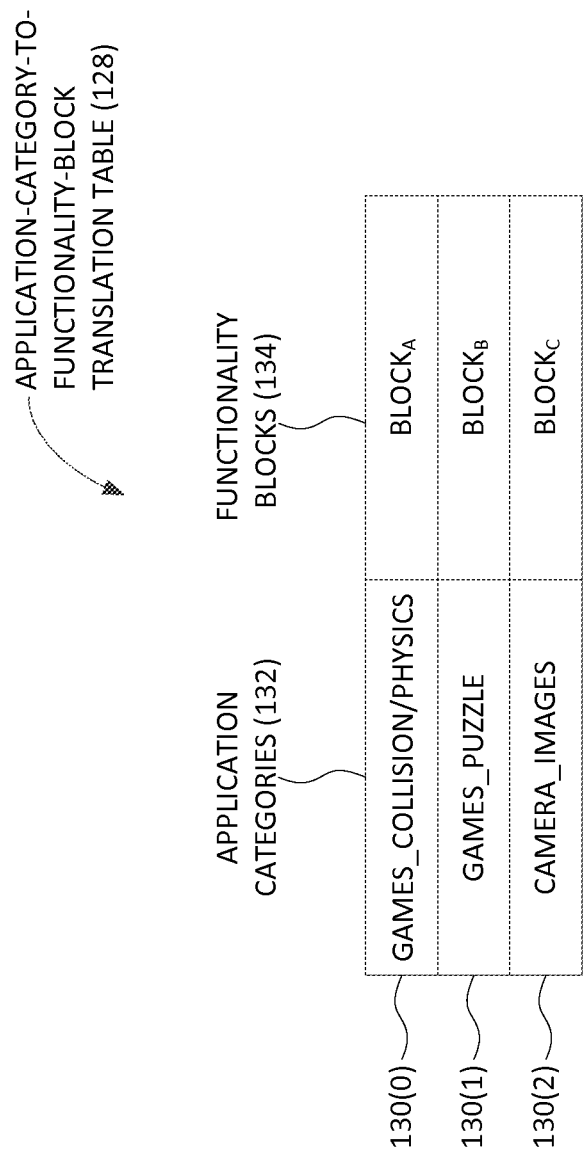

In this regard, FIG. 8A illustrates an exemplary application-to-application-category translation table for mapping applications to corresponding application categories. Similarly, FIG. 8B illustrates an exemplary application-category-to-functionality-block translation table for mapping application categories to corresponding functionality blocks. The application-to-application-category translation table of FIG. 8A and the application-category-to-functionality-block translation table of FIG. 8B may be used together by the adaptive hardware reconfiguration circuit 50 of FIG. 2 to access application-to-functionality-block mappings.

In FIG. 8A, an application-to-application-category translation table 120 includes mappings 122(0)-122(5) representing mappings of applications 124 to application categories 126. In the example of FIG. 8A, mappings 122(0) and 122(1) indicate that applications "NEED FOR SPEED" and "AGE OF EMPIRES," respectively, belong to application category "GAMES_COLLISION/PHYSICS." Similarly, mappings 122(2) and 122(3) indicate that applications "CHESS" and "SODUKO," respectively, belong to application category "GAMES_PUZZLE," and mappings 122(4) and 122(5) indicate that applications "CAMERA" and "INSTAGRAM," respectively, belong to category "CAMERA_IMAGES."

Referring now to FIG. 8B, an application-category-to-functionality-block translation table 128 includes mappings 130(0)-130(2) that represent mappings of application categories 132 (corresponding to the application categories 126 of FIG. 8A) to functionality blocks 134. As seen in FIG. 8B, the mapping 130(0) indicates that the application category "GAMES_COLLISION/PHYSICS" is mapped to the functionality block $BLOCK_A$, which may provide collision detection functionality. Likewise, the mapping 130(1) indicates that the application category "GAMES_PUZZLE" is mapped to the functionality block $BLOCK_B$ providing game logic functionality, and the mapping 130(2) indicates that the application category "CAMERA_IMAGE" is mapped to the functionality block $BLOCK_C$ providing photograph functionality.

Figure 9A:
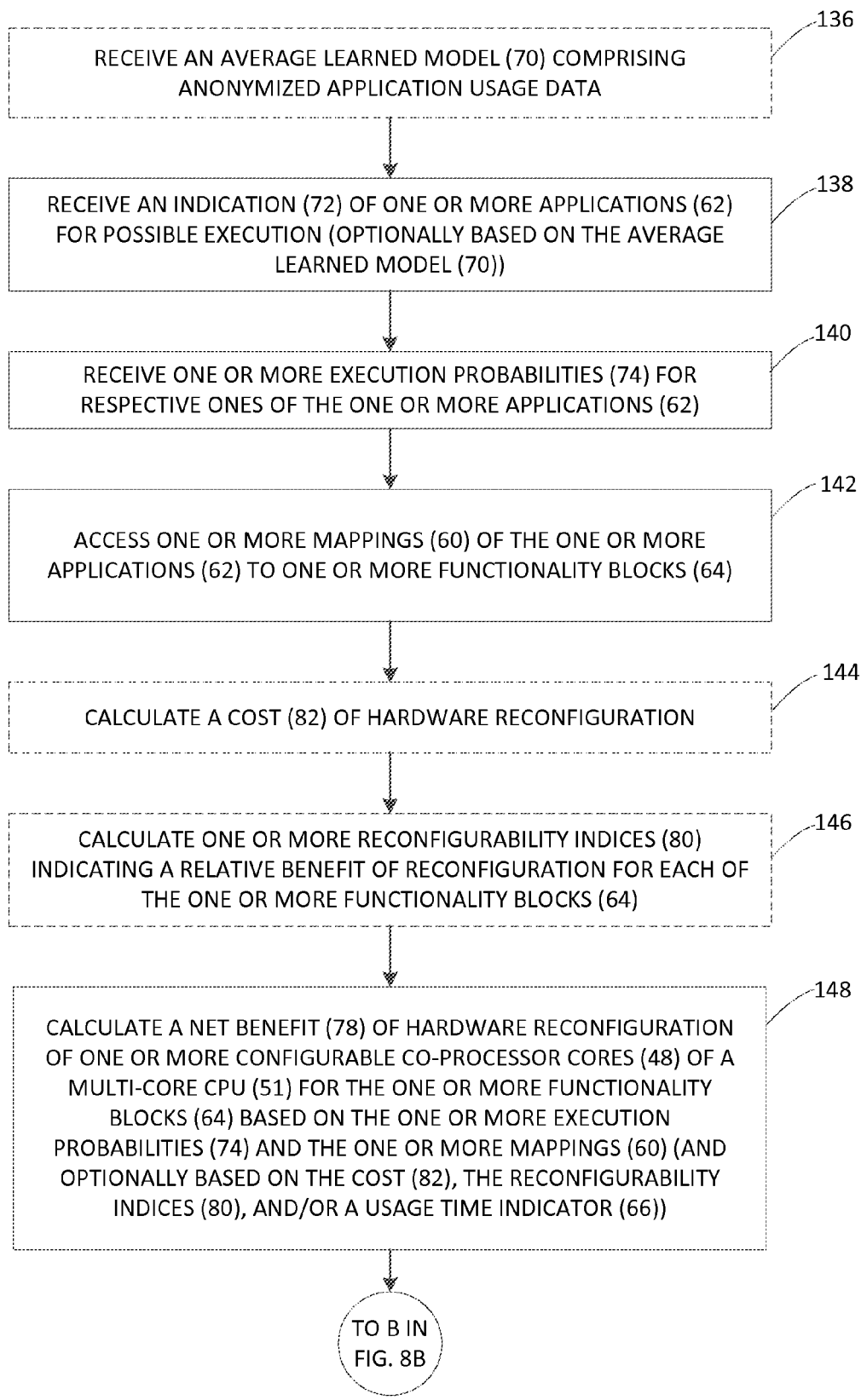
FIGS. 9A and 9B are flowcharts illustrating more detailed exemplary operations for adaptive reconfiguration of configurable co-processor cores for hardware optimization of functionality blocks based on use case prediction.
Figure 9B:
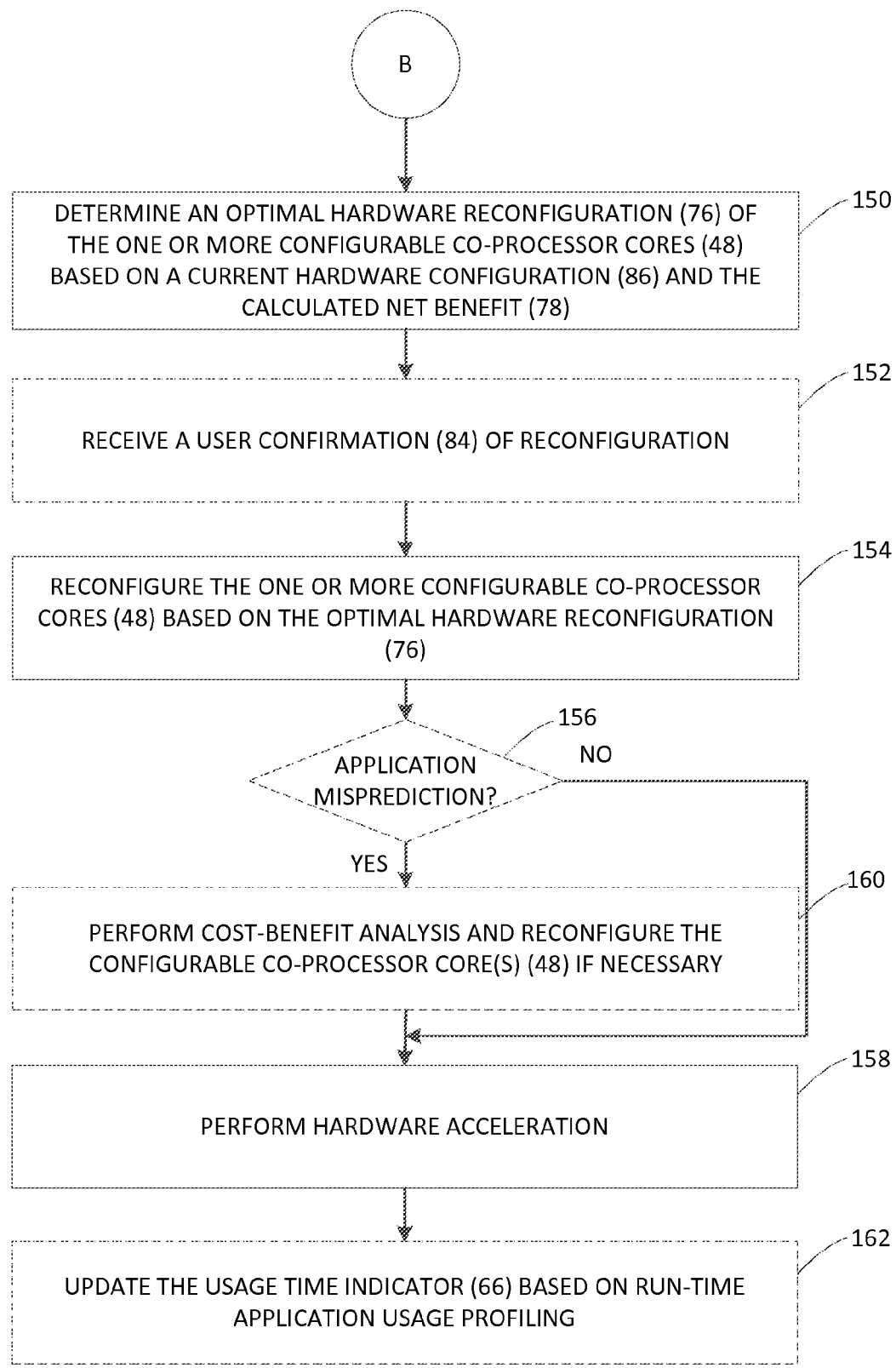

FIGS. 9A and 9B are flowcharts illustrating more detailed exemplary operations for adaptive reconfiguration of configurable co-processor cores for hardware optimization of functionality blocks based on use case prediction. For the sake of clarity, elements of FIGS. 2-4 are referenced in describing FIGS. 9A and 9B. FIG. 9A illustrates exemplary operations for calculating a net benefit 78 of hardware reconfiguration, while FIG. 9B illustrates exemplary operations for determining and implementing an optimal hardware reconfiguration 76.

In FIG. 9A, operations begin with the adaptive hardware reconfiguration circuit 50 of FIG. 2 optionally receiving an average learned model 70 comprising anonymized application usage data (block 136). In some embodiments, the average learned model 70 may be received by the profile analysis agent 53 of the adaptive hardware reconfiguration circuit 50. The average learned model 70 may be obtained via download or may be hardcoded as a default mode, and may be used as a "seed" to initialize the application usage model 68 used by the profile analysis agent 53.

The adaptive hardware reconfiguration circuit 50 next receives an indication 72 of one or more applications 62 for possible execution (block 138). In some embodiments, the indication 72 of the one or more applications 62 for possible execution may be provided by the profile analysis agent 53. The indication 72 represents the use case prediction made by the profile analysis agent 53. The use case prediction may optionally be based on the average learned model 70, as non-limiting examples.

The adaptive hardware reconfiguration circuit 50 then receives one or more execution probabilities 74 for respective ones of the one or more applications 62 (block 140). Each of the one or more execution probabilities 74 represents a relative likelihood of execution of the corresponding one or more applications 62 that are indicated as candidates for execution. Some embodiments may provide that the execution probabilities 74 are provided by the predictor agent 54 of the adaptive hardware reconfiguration circuit 50 based on a current state of application usage as it corresponds to a known application usage pattern. In some embodiments, the optimization agent 56 of the adaptive hardware reconfiguration circuit 50 receives the one or more execution probabilities 74 from the predictor agent 54.

The adaptive hardware reconfiguration circuit 50 then accesses one or more mappings 60 of the one or more applications 62 to one or more functionality blocks 64 (block 142). Some embodiments may provide that accessing the one or more mappings 60 is carried out by the optimization agent 56 of the adaptive hardware reconfiguration circuit 50. The mappings 60 enable the optimization agent 56 to determine the functionality blocks 64 constituting the one or more applications 62 indicated by the indication 72. In some embodiments, the adaptive hardware reconfiguration circuit 50 may access the one or more mappings 60 using the application-to-functionality-block translation table 58. According to some embodiments described herein, the one or more mappings 60 may be accessed by accessing the application-to-application-category translation table 120 and the application-category-to-functionality-block translation table 128 of FIGS. 8A and 8B, respectively.

The adaptive hardware reconfiguration circuit 50 optionally calculates a cost 82 of hardware reconfiguration (block 144). The cost 82 may include a processing cost, a resource cost, a time cost, and/or an energy cost for obtaining a particular hardware accelerator and/or implementing a hardware reconfiguration of the configurable co-processor core(s) 48. The adaptive hardware reconfiguration circuit 50 may also calculate one or more reconfigurability indices 80 indicating a relative benefit of reconfiguration for each of the one or more functionality blocks 64 (block 146). The reconfigurability indices 80 may represent a relative benefit of reconfiguration for each of the functionality blocks 64. Some embodiments may provide that the benefit of reconfiguration represented by the reconfigurability indices 80 is defined as a maximization of system performance or a minimization of energy consumption, as non-limiting examples.

The adaptive hardware reconfiguration circuit 50 next calculates a net benefit 78 of hardware reconfiguration of the one or more configurable co-processor cores 48 of the multicore CPU 51 for the one or more functionality blocks 64 of the one or more applications 62 based on the one or more execution probabilities 74 and the one or more mappings 60 (block 148). The net benefit 78 may optionally be further based on the cost 82, the reconfigurability indices 80, and/or a usage time indicator 66 indicated by the one or more mappings 60. Processing then continues at block 134 of FIG. 9B.

Referring now to FIG. 9B, the adaptive hardware reconfiguration circuit 50 determines an optimal hardware reconfiguration 76 of the one or more configurable co-processor cores 48 based on a current hardware configuration 86 and the calculated net benefit 78 (block 150). In some embodiments, the current hardware configuration 86 may be provided by the hardware controller 34, and may indicate one or more hardware accelerators currently in use. The adaptive hardware reconfiguration circuit 50 may optionally receive a user confirmation 84 of reconfiguration (block 152). For example, the optimization agent 56 of the adaptive hardware reconfiguration circuit 50 may prompt the user for confirmation or authorization before performing a reconfiguration.

The adaptive hardware reconfiguration circuit 50 then reconfigures the one or more configurable co-processor cores 48 based on the optimal hardware reconfiguration 76 (block 154). In some embodiments, reconfiguring the one or more configurable co-processor cores 48 comprises reconfiguring the one or more configurable co-processor cores 48 to operate as a hardware accelerator for optimal execution of the one or more functionality blocks 64. The hardware accelerator may be one of one or more hardware accelerators that are manually designated by a user as preferred accelerators, and/or may be automatically selected from among available hardware accelerators.

In some embodiments, the adaptive hardware reconfiguration circuit 50 may determine whether an application misprediction has occurred (i.e., whether the currently executing application is one that benefits from the optimal hardware reconfiguration 76) (block 156). If not, processing resumes at block 158. However, if it is determined at decision block 156 that an application misprediction has occurred, the adaptive hardware reconfiguration circuit 50 may perform a cost-benefit analysis, and may reconfigure the configurable co-processor core(s) 48 if necessary (block 160). Some embodiments may provide that the process of carrying out an analysis of the costs and benefits of reconfiguration may be similar to operations for generating the net benefit 78, except that the analysis is based on the currently executing application rather than a predicted application. In some embodiments, the process of performing the cost-benefit analysis may include mapping the currently executing application to one or more functionality blocks using, for example, the application-to-functionality-block translation table 58. After reconfiguration based on the coast-benefit analysis performed in block 160 (if necessary), the configurable co-processor core(s) 48 then performs hardware acceleration according to the current configuration (block 158).

The adaptive hardware reconfiguration circuit 50 may then optionally update the usage time indicator 66 based on run-time application usage profiling (block 162). In some embodiments, the usage time indicator 66 may be updated based on an average value of past usage, on MFU, on MRU, or on a weighted combination of MFU and MRU. Other learning-prediction and/or modeling techniques may also be used to update the usage time indicator 66.

The adaptive hardware reconfiguration circuit for providing adaptive hardware reconfiguration of configurable co-processor cores according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 10:
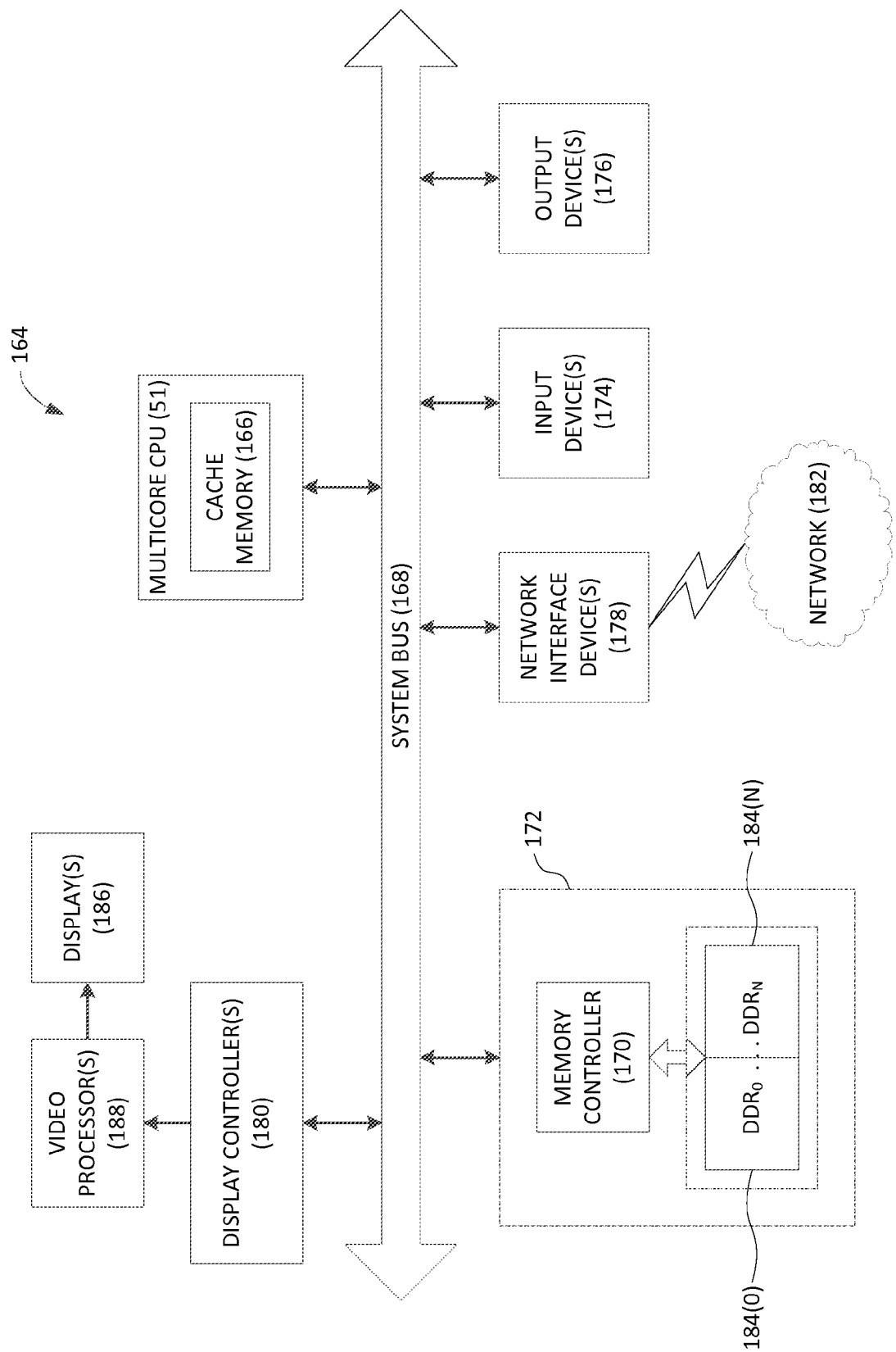
FIG. 10 is a diagram of an exemplary processor-based system that can include instruction processing circuits, including an adaptive hardware reconfiguration circuit, such as the adaptive hardware reconfiguration circuit of FIG. 2, configured to provide adaptive reconfiguration of configurable co-processor cores.

In this regard, FIG. 10 illustrates an example of a processor-based system 164 that can employ the adaptive hardware reconfiguration circuit 50 illustrated in FIG. 2. In this example, the processor-based system 164 includes the multicore CPU 51 of FIG. 2. The multicore CPU 51 may implement the adaptive hardware reconfiguration circuit 50 in whole or in part. The multicore CPU 51 may have cache memory 166 for rapid access to temporarily stored data. The multicore CPU 51 is coupled to a system bus 168 and can intercouple master and slave devices included in the processor-based system 164. As is well known, the multicore CPU 51 communicates with these other devices by exchanging address, control, and data information over the system bus 168. For example, the multicore CPU 51 can communicate bus transaction requests to a memory controller 170, as an example of a slave device. Although not illustrated in FIG. 10, multiple system buses 168 could be provided.

Other master and slave devices can be connected to the system bus 168. As illustrated in FIG. 10, these devices can include a memory system 172, one or more input devices 174, one or more output devices 176, one or more network interface devices 178, and one or more display controllers 180, as examples. The input device(s) 174 can include any type of input device, including but not limited to input keys, switches, voice processors, etc. The output device(s) 176 can include any type of output device, including but not limited to audio, video, other visual indicators, etc. The network interface device(s) 178 can be any device(s) configured to allow exchange of data to and from a network 182. The network 182 can be any type of network, including but not limited to a wired or wireless network, a private or public network, a local area network (LAN), a wide local area network (WLAN), and the Internet. The network interface device(s) 178 can be configured to support any type of communications protocol desired. The memory system 172 can include one or more memory units 184(0)-184(N).

The multicore CPU 51 may also be configured to access the display controller(s) 180 over the system bus 168 to control information sent to one or more displays 186. The display controller(s) 180 sends information to the display(s) 186 to be displayed via one or more video processors 188, which process the information to be displayed into a format suitable for the display(s) 186. The display(s) 186 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of adaptive hardware reconfiguration of configurable co-processor cores of a multicore central processing unit (CPU) for hardware optimization of functionality blocks based on use case prediction, comprising:
   receiving an indication of one or more applications for possible execution;
   receiving one or more execution probabilities for respective ones of the one or more applications;
   accessing one or more mappings of the one or more applications to one or more functionality blocks;
   calculating a net benefit of hardware reconfiguration of one or more configurable co-processor cores of a multicore CPU for the one or more functionality blocks based on the one or more execution probabilities and the one or more mappings;
   determining an optimal hardware reconfiguration of the one or more configurable co-processor cores based on a current hardware configuration and the calculated net benefit; and
   reconfiguring the one or more configurable co-processor cores based on the optimal hardware reconfiguration.

2. The method of claim 1, wherein calculating the net benefit of hardware reconfiguration is further based on calculating a cost of hardware reconfiguration.

3. The method of claim 1, wherein the indication of the one or more applications for possible execution is based on a frequency of usage of the one or more applications, a frequency of usage of the one or more functionality blocks, a time of usage of the one or more applications, a location of usage of the one or more applications, an availability of network resources, or a correspondence between a usage of two or more applications, or combinations thereof.

4. The method of claim 1, wherein the one or more mappings of the one or more applications to the one or more functionality blocks comprises:
the one or more mappings of the one or more applications to one or more application categories; and
the one or more mappings of the one or more application categories to the one or more functionality blocks.

5. The method of claim 1, further comprising receiving an average learned model comprising anonymized application usage data;
wherein receiving the indication of the one or more applications for possible execution is based on the average learned model.

6. The method of claim 1, further comprising calculating one or more reconfigurability indices indicating a relative benefit of reconfiguration for each of the one or more functionality blocks;
wherein calculating the net benefit comprises calculating the net benefit based on a comparison of products of ones of the one or more execution probabilities and corresponding ones of the one or more reconfigurability indices.

7. The method of claim 6, wherein calculating the net benefit comprises calculating the net benefit based on the comparison of the products of the ones of the one or more execution probabilities, the corresponding ones of the one or more reconfigurability indices, and corresponding ones of one or more usage time indicators for each of the one or more mappings.

8. The method of claim 7, wherein at least one of the one or more mappings of the one or more applications to the one or more functionality blocks is a many-to-many mapping.

9. The method of claim 7, wherein the one or more usage time indicators comprises static usage time indicators derived based on profiling a plurality of users.

10. The method of claim 7, further comprising dynamically updating the one or more usage time indicators based on run-time application usage profiling.

11. An adaptive hardware reconfiguration circuit providing hardware optimization of functionality blocks based on use case prediction, the adaptive hardware reconfiguration circuit comprising:
a profile analysis agent configured to indicate one or more applications for possible execution;
a predictor agent configured to determine one or more execution probabilities for respective ones of the one or more applications;
an optimization agent configured to:
access one or more mappings of the one or more applications to one or more functionality blocks;
calculate a net benefit of hardware reconfiguration of one or more configurable co-processor cores for the one or more functionality blocks based on the one or more execution probabilities and the one or more mappings; and
determine an optimal hardware reconfiguration of the one or more configurable co-processor cores based on a current hardware configuration and the calculated net benefit; and
a hardware controller configured to reconfigure the one or more configurable co-processor cores based on the optimal hardware reconfiguration.

12. The adaptive hardware reconfiguration circuit of claim 11, integrated into a multicore central processing unit (CPU) comprising:
the one or more configurable co-processor cores; and
a memory configured to store the one or more mappings of the one or more applications to the one or more functionality blocks.

13. The adaptive hardware reconfiguration circuit of claim 12, wherein the memory is configured to store the one or more mappings of the one or more applications to the one or more functionality blocks by:
storing the one or more mappings of the one or more applications to one or more application categories; and
storing the one or more mappings of the one or more application categories to the one or more functionality blocks.

14. The adaptive hardware reconfiguration circuit of claim 11, wherein the optimization agent is further configured to calculate one or more reconfigurability indices indicating a relative benefit of reconfiguration for each of the one or more functionality blocks;
wherein the optimization agent is configured to calculate the net benefit based on a comparison of products of ones of the one or more execution probabilities and corresponding ones of the one or more reconfigurability indices.

15. The adaptive hardware reconfiguration circuit of claim 14, wherein the optimization agent is configured to calculate the net benefit based on the comparison of the products of the ones of the one or more execution probabilities, the corresponding ones of the one or more reconfigurability indices, and corresponding ones of one or more usage time indicators for each of the one or more mappings.

16. A non-transitory computer-readable medium having stored thereon computer-executable instructions to cause a processor to implement a method for adaptive hardware reconfiguration of configurable co-processor cores of a multicore central processing unit (CPU) for hardware optimization of functionality blocks based on use case prediction, the method comprising:
receiving an indication of one or more applications for possible execution;
receiving one or more execution probabilities for respective ones of the one or more applications;
accessing one or more mappings of the one or more applications to one or more functionality blocks;
calculating a net benefit of hardware reconfiguration of one or more configurable co-processor cores of a multicore CPU for the one or more functionality blocks based on the one or more execution probabilities and the one or more mappings;
determining an optimal hardware reconfiguration of the one or more configurable co-processor cores based on a current hardware configuration and the calculated net benefit; and
reconfiguring the one or more configurable co-processor cores based on the optimal hardware reconfiguration.

17. The non-transitory computer-readable medium of claim 16 having stored thereon the computer-executable instructions to cause the processor to implement the method, wherein the one or more mappings of the one or more applications to the one or more functionality blocks comprises:
the one or more mappings of the one or more applications to one or more application categories; and the one or more mappings of the one or more application categories to the one or more functionality blocks.

18. The non-transitory computer-readable medium of claim 16 having stored thereon the computer-executable instructions to cause the processor to implement the method, further comprising calculating one or more reconfigurability indices indicating a relative benefit of reconfiguration for each of the one or more functionality blocks;
wherein calculating the net benefit comprises calculating the net benefit based on a comparison of products of ones of the one or more execution probabilities and corresponding ones of the one or more reconfigurability indices.

19. The non-transitory computer-readable medium of claim 18 having stored thereon the computer-executable instructions to cause the processor to implement the method, wherein calculating the net benefit comprises calculating the net benefit based on the comparison of the products of the ones of the one or more execution probabilities, the corresponding ones of the one or more reconfigurability indices, and corresponding ones of one or more usage time indicators for each of the one or more mappings.

20. The non-transitory computer-readable medium of claim 19 having stored thereon the computer-executable instructions to cause the processor to implement the method, wherein at least one of the one or more mappings of the one or more applications to the one or more functionality blocks is a many-to-many mapping.

* * * * *